(12) United States Patent
Huang et al.

(10) Patent No.: US 11,216,472 B2
(45) Date of Patent: *Jan. 4, 2022

(54) SYSTEMS AND USER INTERFACES FOR DATA ANALYSIS INCLUDING ARTIFICIAL INTELLIGENCE ALGORITHMS FOR GENERATING OPTIMIZED PACKAGES OF DATA ITEMS

(71) Applicant: Palantir Technologies Inc., Palo Alto, CA (US)

(72) Inventors: Yifei Huang, New York, NY (US);
Grace Garde, South Orange, NJ (US);
Nikhita Singh, New York, NY (US);
Sarah Gershkon, New York, NY (US);
James Winchester, New York, NY (US); Laurynas Pliuskys, London (GB)

(73) Assignee: Palantir Technologies Inc., Denver, CO (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/570,573

(22) Filed: Sep. 13, 2019

(65) Prior Publication Data
US 2020/0004743 A1    Jan. 2, 2020

Related U.S. Application Data

(63) Continuation of application No. 15/482,443, filed on Apr. 7, 2017, now Pat. No. 10,452,673, which is a
(Continued)

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06N 5/022* (2013.01); *G06N 20/00* (2019.01)

(58) Field of Classification Search
CPC ...... G06N 5/022; G06N 20/00; G06F 16/248; G06F 16/24578; G06F 16/2457
(Continued)

(56) References Cited

U.S. PATENT DOCUMENTS 8,935,303 B2 * 1/2015 Karalzoglou ...... G06Q 30/0282
707/813
9,176,966 B2 * 11/2015 Silverstein ............. G06F 16/80
(Continued)

*Primary Examiner* — Shahid A Alam
(74) *Attorney, Agent, or Firm* — Knobbe Martens Olson & Bear LLP

(57) ABSTRACT

Systems and user interfaces enable integration of data items from disparate sources to generate optimized packages of data items. For example, the systems described herein can obtain data items from various sources, score the data items, and present, via an interactive user interface, options for packaging the data items based on the scores. The systems may include artificial intelligence algorithms for selecting optimal combinations of data items for packaging. Further, the interactive user interfaces may enable a user to efficiently add data items to, and remove data items from, the data packages. The system may interactively re-calculate and update scores associated with the package of data items as the user interacts with the data package via the user interface. The systems and user interfaces may thus, according to various embodiments, enable the user to optimize the packages of data items based on multiple factors quickly and efficiently.

12 Claims, 21 Drawing Sheets

Related U.S. Application Data continuation of application No. 15/096,832, filed on Apr. 12, 2016, now Pat. No. 9,652,510.

(60) Provisional application No. 62/272,517, filed on Dec. 29, 2015.

(51) Int. Cl.
*G06N 20/00* (2019.01)
*G06N 5/02* (2006.01)

(58) Field of Classification Search
USPC .......................................................... 707/723
See application file for complete search history.

(56) References Cited

U.S. PATENT DOCUMENTS

| | | | |
|---|---|---|---|
| 9,652,510 B1 * | 5/2017 | Huang | G06F 16/24578 |
| 10,452,673 B1 | 10/2019 | Huang et al. | |
| 2008/0270398 A1 * | 10/2008 | Landau | G06Q 30/02 |
| | | | 707/706 |
| 2013/0187926 A1 * | 7/2013 | Silverstein | G06F 16/80 |
| | | | 345/440 |
| 2014/0143252 A1 * | 5/2014 | Silverstein | G06F 16/972 |
| | | | 707/737 |
| 2014/0188865 A1 * | 7/2014 | Karatzoglou | G06Q 30/0282 |
| | | | 707/732 |
| 2015/0199612 A1 * | 7/2015 | Segall | G06N 5/04 |
| | | | 706/52 |
| 2019/0026786 A1 * | 1/2019 | Khoury | G06Q 30/0271 |
| 2019/0108286 A1 * | 4/2019 | Pan | G06F 16/9027 |

* cited by examiner

| CURRENT PACKAGE | 72 total spots | | RECOMMENDATIONS (+) (−) | | ALL SELECTED |
|---|---|---|---|---|---|
| Event A - Date, Time | | FBC ▶ | ⊖ Event G - Date, Time | $$ | FBC ☐ ✕ |
| Event B - Date, Time | | FBC ▶ | ⊖ Event M - Date, Time | $$ | FBC ☐ ✕ |
| Event C - Date, Time | | FBC ▶ | ⊖ Event X - Date, Time | $$ | FBC ☐ ✕ |
| Event D - Date, Time | | FBC ▶ | ⊖ Event Y - Date, Time | $$ | FBC ☐ ✕ |
| Event E - Date, Time | | FBC ▶ | ⊖ Event Z - Date, Time | $$ | FBC ☐ ✕ |
| Event F - Date, Time | | FBC ▶ | ⊖ Event AA - Date, Time | $$ | FBC ☐ ✕ |
| Event G - Date, Time | | FBC ▶ | ⊖ Event CC - Date, Time | $$ | FBC ☐ ✕ |
| Event H - Date, Time | | FBC ▶ | | | |

FIG. 2D

CURRENT PACKAGE — 72 total spots

Event A - Date, Time — FBC ◄

| Week | Units | Spot Fee | CPM | Delete? |
|---|---|---|---|---|
| Date, Time | 1.00 | $$ | ## | × |
| Date, Time | 1.00 | $$ | ## | × |
| Date, Time | 1.00 | $$ | ## | × |
| Date, Time | 1.00 | $$ | ## | × |

Event B - Date, Time — FBC ►

Event C - Date, Time — FBC ►

Event D - Date, Time — FBC ►

RECOMMENDATIONS ⊕ ⊖    ALL    SELECTED

| ⊖ Event G - Date, Time | $$ | FBC | ▭ | × |
| ⊖ Event M - Date, Time | $$ | FBC | ▭ | × |
| ⊖ Event X - Date, Time | $$ | FBC | ▭ | × |
| ⊖ Event Y - Date, Time | $$ | FBC | ▭ | × |
| ⊖ Event Z - Date, Time | $$ | FBC | ▭ | × |
| ⊖ Event AA - Date, Time | $$ | FBC | ▭ | × |
| ⊖ Event CC - Date, Time | $$ | FBC | ▭ | × |

FIG. 2E

CURRENT PACKAGE — 72 total spots

- Event A - Date, Time — FBC ▶
- Event B - Date, Time — FBC ▶
- Event C - Date, Time — FBC ▶
- Event D - Date, Time — FBC ▶
- Event E - Date, Time — FBC ▶
- Event F - Date, Time — FBC ▶
- Event G - Date, Time — FBC ▶
- Event H - Date, Time — FBC ▶

212

RECOMMENDATIONS ⊕ ⊖    ALL   SELECTED

⊖ Event G - Date, Time   $$   FBC   ✕  — 210

Apply? Week | Total Avails | Cal Avails | Spot Fee | CPM | # Units
---|---|---|---|---|---
☉ Date, Time | -1.5 | 6.0 | $$ | ## | 1

220

⊖ Event M - Date, Time   $$$$   FBC   ✕

Apply? Week | Total Avails | Cal Avails | Spot Fee | CPM | # Units
---|---|---|---|---|---
☉ Date, Time | -2.0 | 5.0 | $$ | ## | 1
☉ Date, Time | -6.0 | 5.0 | $$ | ## | 1

⊖ Event X - Date, Time   $$   FBC   ✕

CURRENT PACKAGE — 72 total spots — 212

- Event A - Date, Time — FBC ▶
- Event B - Date, Time — FBC ▶
- Event C - Date, Time — FBC ▶
- Event D - Date, Time — FBC ▶
- Event E - Date, Time — FBC ▶
- Event F - Date, Time — FBC ▶
- Event H - Date, Time — FBC ▶
- Event I - Date, Time — FBC ▶

RECOMMENDATIONS (+) (−) ALL SELECTED — 222

- ⊖ Event X - Date, Time — $$
- ⊖ Event Y - Date, Time — $$
- ⊖ Event Z - Date, Time — $$
- ⊖ Event AA - Date, Time — $$
- ⊖ Event CC - Date, Time — $$
- ⊖ Event II - Date, Time — $$
- ⊖ Event JJ - Date, Time — $$

Package History ×
- (43.4) Edit Time
- Event G - Date, Time
- ⊖ Date, Time
- ⊖ Date, Time
- Event M - Date, Time
- ⊖ Date, Time
- Event RR
- ⊖ Date, Time
- Event TT
- ⊖ Date, Time
- ⊖ Date, Time
- (44.5) Edit Time

AVAILABILITY TRACKER

Event [Event 1 ▽]   DEMO [Demo 1 ▽] ← 414

UPCOMING AVAILS

| WEEKSTART | Network | PRICE | CPM | VPVH | RATING | IMPRESSIONS | AVAIL | CAPACITY |
|---|---|---|---|---|---|---|---|---|
| 2016-02-15 | Network 1 | $$ | $$ | 0.84 | 0 | ## | 6 | 11 |
| 2015-11-16 | Network 1 | $$ | $$ | 0.83 | 0 | ## | 0.5 | 11 |
| 2016-02-01 | Network 1 | $$ | $$ | 0.84 | 0 | ## | 7.5 | 11 |
| 2016-01-04 | Network 1 | $$ | $$ | 0.85 | 0 | ## | 5.5 | 11 |
| 2016-07-11 | Network 1 | $$ | $$ | 0.82 | 0 | ## | 6 | 11 |
| 2015-12-21 | Network 1 | $$ | $$ | 0.74 | 0 | ## | 3.5 | 11 |

FIG. 4B

SELLING TITLE FINDER

Event Type [ Type 1 ▽ ] ← 416    CATEGORY [ Category 1 ▽ ] ← 418

| RENTRAK SHOW NAME | % OVER INDEXED IN CATEGORY |
|---|---|
| Event 1 | 35.5% |
| Event 2 | 33.4% |
| Event 3 | 32.0% |
| Event 4 | 29.1% |
| Event 5 | 24.7% |
| Event 6 | 23.5% |
| Event 7 | 22.9% |
| Event 8 | 21.9% |
| Event 9 | 17.9% |

FIG. 4C

INDEX EDITOR

You can use this module to test your deal at different index values. Enter in a new index value below to edit your package and see your new score.

ORIGINAL DEAL INDEX ##

CURRENT DEAL INDEX ##

ENTER NEW INDEX ## —516

[Score deal]

NEW DEAL METRICS

Score ##
Budget $$
CPM $$

—518

SAVE

SYSTEMS AND USER INTERFACES FOR DATA ANALYSIS INCLUDING ARTIFICIAL INTELLIGENCE ALGORITHMS FOR GENERATING OPTIMIZED PACKAGES OF DATA ITEMS

CROSS-REFERENCE TO RELATED APPLICATIONS

This application is a continuation of U.S. patent application Ser. No. 15/482,443, filed Apr. 7, 2017, entitled "SYSTEMS AND USER INTERFACES FOR DATA ANALYSIS INCLUDING ARTIFICIAL INTELLIGENCE ALGORITHMS FOR GENERATING OPTIMIZED PACKAGES OF DATA ITEMS," which is a continuation of U.S. patent application Ser. No. 15/096,832, filed Apr. 12, 2016, entitled "SYSTEMS AND USER INTERFACES FOR DATA ANALYSIS INCLUDING ARTIFICIAL INTELLIGENCE ALGORITHMS FOR GENERATING OPTIMIZED PACKAGES OF DATA ITEMS," which claims priority to U.S. Patent Application No. 62/272,517, filed Dec. 29, 2015, entitled "SYSTEMS AND USER INTERFACES FOR DATA ANALYSIS INCLUDING ARTIFICIAL INTELLIGENCE ALGORITHMS FOR GENERATING OPTIMIZED PACKAGES OF DATA ITEMS," which is hereby incorporated by reference herein in its entirety.

TECHNICAL FIELD

The present disclosure relates to systems and techniques for accessing one or more databases, and aggregating, analyzing, and displaying data in interactive user interfaces. More specifically, the present disclosure relates to user interfaces and artificial intelligence algorithms for generating optimized packages of data items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different entities may manage data that can be useful in generating packages of data items. Thus, such data items may be stored in multiple, and often incompatible, databases. Given the disparate sources of data items, it can be difficult for a user to gather such data and view the information in a user interface.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for integrating data (e.g., data items) from disparate sources to generate optimized packages of data items. For example, the systems described herein can obtain data items from various sources, score the data items, and present, via an interactive user interface, options for packaging the data items based on the scores. The systems may include artificial intelligence algorithms for selecting optimal combinations of data items for packaging. Further, the interactive user interfaces may enable a user to efficiently add data items to, and remove data items from, the data packages. The system may interactively re-calculate and update scores associated with the package of data items as the user interacts with the data package via the user interface. The systems and user interfaces may thus, according to various embodiments, enable the user to optimize the packages of data items based on multiple factors quickly and efficiently.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer-executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer-executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 2A-2G illustrate an example package editor user interface, in accordance with some embodiments;

FIGS. 3A-3E illustrate an example user profile user interface, in accordance with some embodiments;

FIGS. 4A-4C illustrate example negotiation tool user interfaces, in accordance with some embodiments;

FIGS. 5A-5B illustrate example evaluation tool user interfaces, in accordance with some embodiments;

DETAILED DESCRIPTION OF SPECIFIC EMBODIMENTS

Overview

Figure 1:
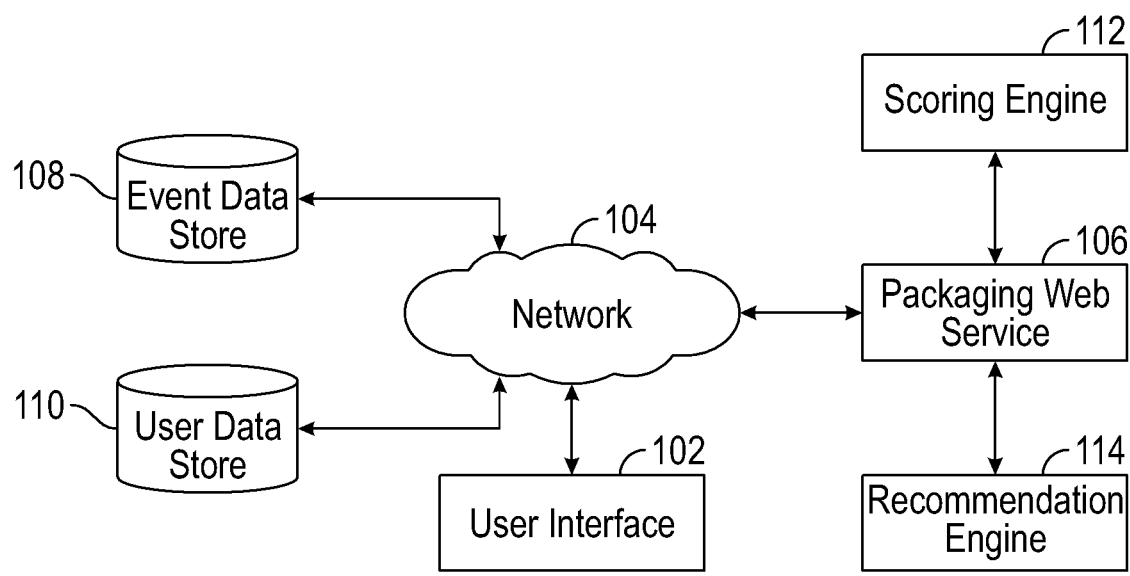
FIG. 1 illustrates a system diagram illustrating how users may access a user interface to interact with a web service, in accordance with some embodiments.

As described above, disclosed herein are various systems and methods for integrating data (e.g., data items) from disparate sources to generate optimized packages of data items. For example, the systems described herein can obtain data items from various sources, score the data items, and present, via an interactive user interface, options for packaging the data items based on the scores. The systems may include artificial intelligence algorithms for selecting optimal combinations of data items for packaging. Further, the interactive user interfaces may enable a user to efficiently add data items to, and remove data items from, the data packages. The system may interactively re-calculate and update scores associated with the package of data items as the user interacts with the data package via the user interface. The systems and user interfaces may thus, according to various embodiments, enable the user to optimize the packages of data items based on multiple factors quickly and efficiently.

The systems and user interfaces described herein may be applied to various fields in which data items are to be optimally packaged together. One such field is television advertising, in which advertising spots (e.g., data items) are matched with advertisers (e.g., another type of data item), prices for the advertising spots are determined, and the advertising spots are packaged together into a deal. In this field, and in other similar fields, it may be challenging to package multiple products (e.g., television spots) with changing values into a single package which has a price that is attractive to buyers (e.g., advertisers) while maximizing value to the seller (e.g., television networks). For example, sales account executives selling advertisement spots may need to have an understanding of the expected value that advertisers can have by using the advertisement spots. This expected value is highly susceptible to change as it is largely based on the number of viewers who are expected to view the advertisement. In such a field, sales account executives do not have a robust, data-driven way of distinguishing one advertisement spot from another, and generally use intuition and an advertiser index to discern between deals with buyers.

The systems and user interfaces disclosed herein help overcome these challenges by employing interactive user interfaces and artificial intelligence algorithms for enabling a user (e.g., an account executive at a television network, a sales representative of a manufacturing company, etc.) to efficiently package data items (e.g., television advertisement spots, billboard space, consumer products, insurance plans, etc.) in a data-driven way, e.g., to maximize revenue. The systems enable aggregating, analyzing, and displaying data items in interactive user interfaces.

As used herein, the term "data item" is a broad term including its ordinary and customary meaning, and includes, but is not limited to, representations of any type of data that may be packaged. For example, data items may include various events (e.g., television shows, movies, advertisement spots, trade fairs, store-wide sales, product releases, etc.). Data items may be associated with one another, and further may relate to a given period of time, place, medium, etc. For example, an advertisement spot may be a period of time (e.g., 1 minute) during a commercial break of a television show. In another example, an advertisement spot may be a portion of a television show where an advertiser may place a product, logo, etc. that may be viewed during the television show. In another example, data items may include download codes for various electronic products, reservation/confirmation codes for participating in events, purchasing products, etc. Data items may represent any other relevant event of thing, depending on the implementation and/or the field of application of the system.

The systems and/or user interfaces may be configured to evaluate and/or score data items. For example, data items may be evaluated based on their commercial value. The score (e.g., commercial value) may be general or may be specific to certain types of entities (e.g., certain buyers of advertising spots) related to a package of data items. For example, certain advertisers may be particularly interested in targeting a demographic, and the commercial value may be an estimated value to a member of that demographic. Using the user interface and the determined commercial value, a user (e.g., a seller) may be enabled to more effectively negotiate deals with buyers.

The systems and/or user interfaces may allow users to create various combinations (e.g., packages) of data items. The system may then evaluate the package and recommend changes that could be made to maximize the commercial value of the combination. For example, a combination may comprise ten advertisement spots that a seller would like to sell to a buyer. Using an artificial intelligence algorithm, the system may determine that one of the selected advertisement spots has a lower expected commercial return to the seller than another available advertisement spot. The service may then recommend replacing the selected advertisement spot with the other available spot.

Accordingly, the systems and methods described herein may provide several benefits. For example, the systems and methods described herein may allow the user to efficiently select data items, or combinations/packages of data items, that are expected to bring a greatest value to a user (e.g., a seller). Further, the systems and methods may help users be aware of an expected value of a data item to ensure that the user does not sell the data item for far less than it is worth. Various other benefits of the systems and methods described herein a mentioned throughout this disclosure.

As mentioned above, throughout the present disclosure advertisement spots during a television show may be used as an example of a data item. However, there may be a variety of data items that may be suitable for use with the described systems and methods. For example, suitable data items may include a billboard, a cover of a video game, an announcement during a sporting event, consumer products, insurance plans, and/or the like.

Example Systems and Network Environment

FIG. 1 shows a system diagram, including a network environment, illustrating how users may access a user interface to interact with a web service, in accordance with some embodiments. FIG. 1 includes a user interface 102, a network 104, a packaging web service 106, an event data store 108, a user data store 110, a scoring engine 112, and a recommendation engine 114.

A user may access the user interface 102 to communicate via the network 104. The user interface 102 may be a web page such as a graphical user interface (GUI), a computer program, or other service suitable for communicating with a network 104. Users may access the user interface 102 by using a computing device, such as a smartphone, tablet, laptop computer, etc.

The network 104 may facilitate communication between the user interface 102 and the packaging web service 106. For example, the packaging web service 106 may be a computer program or system designed to aggregate, analyze, and output data for use in analysis of various information. In some embodiments, the packaging web service 106 and/or other components of FIG. 1 may call an application programming interface (API) to perform various functions. The packaging web service 106 may receive data via the network 104 from the event data store 108 and/or the user data store 110. One or both of the data stores may be databases. Each of the event data store 108 and the user data store 110 may store data items of various types, as described above. The event data store 108 may store and provide to the network 104 various data items related to events, spots, and packages. A spot is a commercial unit that may be purchased by buyers from sellers. An event may include one or more spots. For example, an event may be a television show and a spot may be a portion of a commercial break that an advertiser may purchase to advertise a product.

The term "package," as used herein, is broad term for any data structure for storing and/or organizing data, including, but not limited to, any collection or combination of data items. In the field of television advertising, as described above, a package may be a collection of one or more spots. Additionally, in the field of manufacturing, a package may be a collection of consumer products. A package may have a related entity, e.g., a user who created the package, a user the package is recommended for, and/or the like.

Data stored in the event data store 108 may further include any information related to events, packages, advertisers, and/or the like. For example, the user data store 110 may include data items such as: a date of an event, a cost to purchase a spot, a number of users who have purchased spots, a rating of the event, and/or the like.

The user data store 110 may store and provide to the network 104 various data related to users. For example, such user data may include a user's transaction history with the packaging web service 106, a user's stated preferences, profile/demographic information, package information related to users, and/or the like.

The packaging web service 106 may receive data from the event data store 108 and/or user data store 110, and access the scoring engine 112 and/or the recommendation engine 114 to analyze the received data. For example, the scoring engine 112 may perform evaluation and/or analysis on the event data and/or user data to determine a score for one or more events, spots, and/or packages. The recommendation engine 114 may execute one or more artificial intelligence algorithms to perform analysis on the event data and/or user data to determine a recommended one or more events, spots, and/or packages that may be specific or generic to a user. The packaging web service 106 may compile the results of the scoring engine 112 and/or recommendation engine 114, and/or provide further analysis and output packaging data to the user interface 102, event data store 108, and/or user data store 110.

As used herein, the term "database" is broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure. Such data structures may be configured to store computer-executable instructions that may communicate with various hardware processors to cause said processors to perform various functions.

The above system may be applied for purchasers and/or for sellers. For example, an event may be a television show and users may be purchasers interested in purchasing advertisement slots to use for advertising a product. Other users may be sellers who own advertisement slots for the television show and may access the system to determine suitable prices and target events for selling slots as well as conduct transactions with buyers.

Additional details regarding the systems and/or services by which the functionality of the present disclosure is implemented are provided below.

Example Package Editor User Interfaces

Figure 2B:
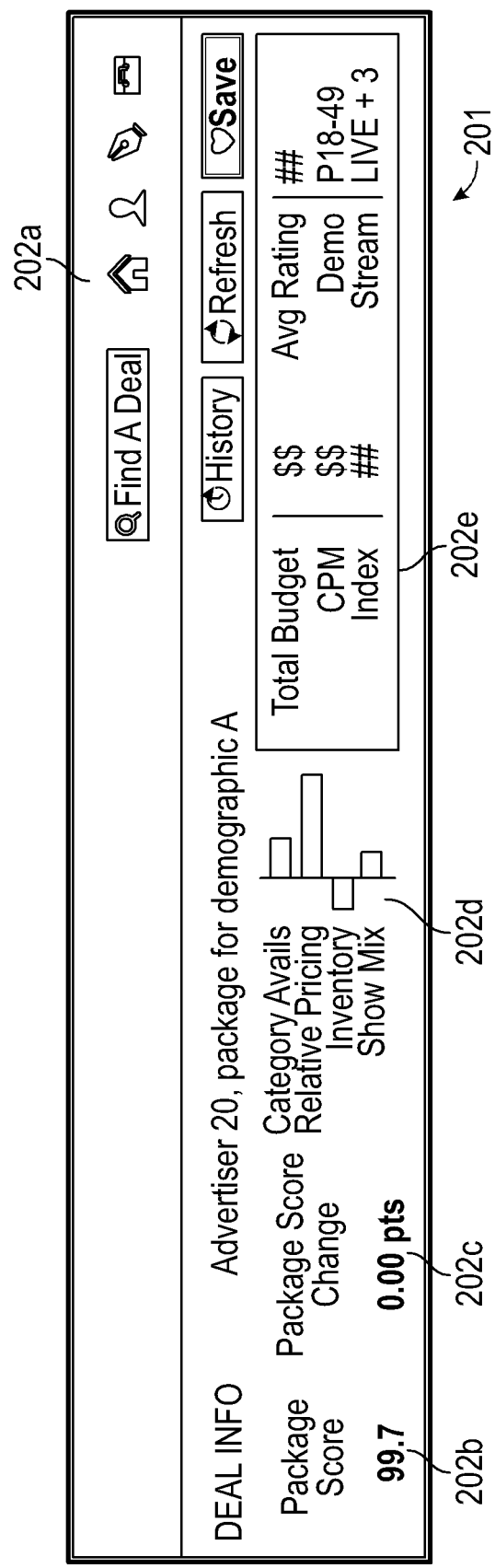

FIGS. 2A-2G illustrate an example package editor user interface 203, in accordance with some embodiments. As indicated by FIG. 2A, each of FIGS. 2B-2G represent example portions of a user interface. In various implementations, the portions of the user interface may be rearranged, and/or may include more of fewer portions/elements.

FIG. 2B illustrates a header 201 that may be included in the user interface 203, as indicated in FIG. 2A. The header 201 may include a variety of icons 202a with various functionality, including linking to other pages (e.g., others of the user interfaces described herein), performing searching functions, viewing user history, refreshing user information, and saving. The header 201 may further include various information, such as information about a current package, such as an overall package score, component scores, etc.

For example, the header 201 may include a package score 202b, which may indicate a score for the currently viewed package (as described below). The score may provide an indication of a value, evaluation, optimization, or relative effectiveness of the package. Thus, as the user interacts with the package via the interactive user interface, e.g., by adding and removing data items, the package score may be re-evaluated by the system and indicated in the header 201.

Package score change indication 202c may indicate a change in the score, as compared to an initial score, as a result of a change to the package. Thus, as the user interacts with the package, the user may be able to easily evaluate an effect that they are having on the score.

Indicators 202d may provide a relative assessment of the package in relation to a population of packages. Such a population may include, for example, a historical set of packages associated with a particular network or advertiser. The system may automatically evaluate packages from the population to determine average values of a plurality of factors. For example, as indicated, the system may determine averages for numbers of categories, relative pricing, inventory, show mix, etc. Then, the system may evaluate the current package in relation of the averages, and indicate, for each of the factors, how the current package compares, e.g., the user interface may provide a horizontal bar chart that indicates a relative amount above or below and average for the factor for the population.

The header 201 may also include values of various calculated parameters 202e regarding the package. These may include, for example, a total budget, a cost per impression (CPM), an index (e.g., an index of the advertiser), an average rating, a demographic, and stream information.

All the values and indicator shown in the header 201 may be updated interactively and automatically as the user interacts with the system via the user interface and changes aspects of a package.

Figure 2C:
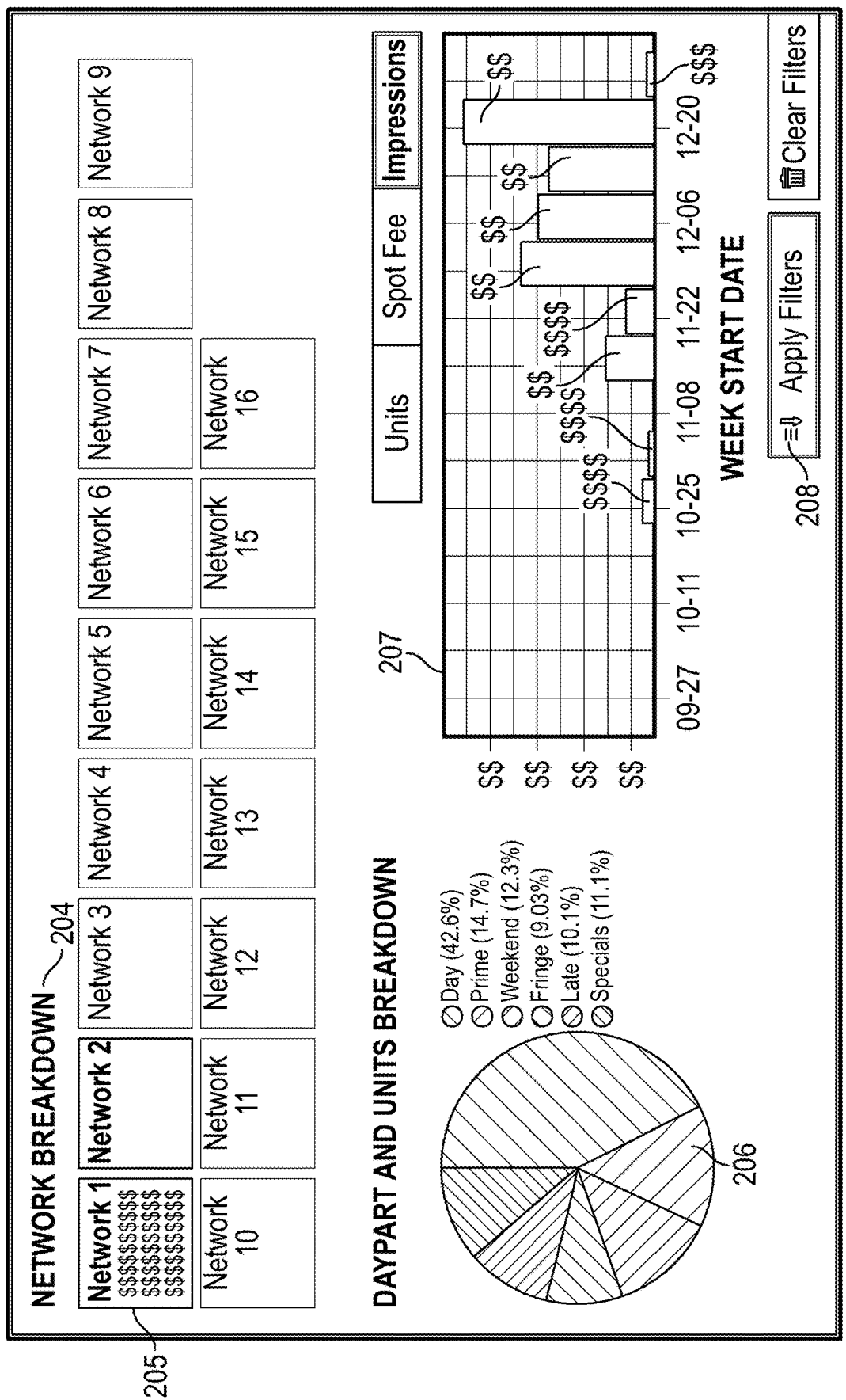

FIG. 2C illustrates a portion of user interface 203 (as indicated in FIG. 2A) that shows a breakdown of various event information based on events (e.g., data items) of the package. A network breakdown 204 may provide information related to networks 205. A network 205 may be a category of events. For example, a network 205 may be a television channel that airs one or more television shows (i.e., events). The network breakdown 204 may provide information specific to individual networks 205, such as name, number of events in the network 205, cost of spots in the network 205, cost per impression for the network 205, etc.

The user interface portion of FIG. 2C also includes a pie chart 206 and a bar chart 207, showing other information related to the package.

Via the user interface, the user may select networks, portions of the pie chart, and/or portions of the bar chart, and apply filtering based on those selections by selecting an apply filters button 208.

FIG. 2D illustrates a user interface portion 209 of user interface 203 (as indicated in FIG. 2A) that shows details of a current package and recommendations (as generated by the system by execution of an artificial intelligence algorithm). The user interface 209 includes a list of events 210. An event 210 may comprise a variety of event information, including a date, time, cost, rating, popularity, schedule, etc. For example, an event 210 may be a television show with an airing date and time. An event 210 may include one or more spots and each spot may have an associated cost that may be reflective of the value of the spot. For example, the cost may indicate how much an advertiser would be expected to pay to advertise during the spot. The cost may be an estimate or may be based on information provided by an owner and/or manager of the spot. The event 210 may also have a rating based on votes from users, critics, a particular individual, etc.

An event 210 may comprise multiple sub-events. For example, if an event 210 is a television show, sub-events may be individual episodes of the show. If one or more episodes have already aired, there may be data available regarding how many viewers watched the show, the demographic information of viewers who watched the show, trends in viewership, etc. The show may also have an associated schedule if it has multiple viewings. All of this information and more may collectively be referred to as "event information" and may be stored in the event data store 108 and/or be analyzed by the packaging web service 106, scoring engine 112, and/or recommendation engine 114.

As shown in FIG. 2D, one or more events 210 and/or spots within the events 210 may be grouped into a unit which will be referred to herein as a "package." A package 212 may be created by a user via the user interface 209 and/or may be created by the packaging web service 106. For example, a user may search from a group of events 210 and/or spots and select one or more to be included in a package 212. The packaging web service 106 may access the scoring engine 112 to determine a score for each individual event 210 and/or spot in the package 212 and/or for the package 212 as a whole. The score may signify an analysis of the value in general and/or specifically to the user of the events 210, spots, and/or the package 212 itself. For example, the score may indicate a predicted economic value to the user.

The packaging web service 106 may further access the recommendation engine 114 to provide one or more recommended events and/or packages. For example, the recommendation engine 114 may determine, by an artificial intelligence algorithm, that one or more available spots have higher scores than a spot in the package created by the user. In some implementations, the artificial intelligence algorithm may comprise a collaborative filtering algorithm, a monte carlo-based algorithm, a genetic algorithm, a simulated annealing algorithm, and/or the like. The system may produce preferred recommendations, meaning recommendations that provide a greater positive impact on the package score, recommendations that the user is more likely to adopt (based on past behaviors and/or historical packages that have been accepted), and/or combinations of these two and/or other factors.

The recommendation engine 114 may recommend adding the one or more available spots to the package and removing the spot having a lower score. As shown in FIG. 2D, the user interface 209 may display a list of recommendations 214. The recommendations 214 may include events 210 that have available spots that the user may remove from a current package and/or events 210 and/or spots that the user may add to the current package. The user may select one or more spots from the recommendations 214 and/or select an icon 216 next to the event 210 to add or remove the selected number of spots from the current package. A user may toggle between viewing a list of recommended additions and a list of recommend removals by selecting the recommendation add and remove 218 icons. The current package 212 and recommendations 214 may be shown side-by-side in the user interface 209 to allow users to more easily edit the current package 212.

FIG. 2E illustrates functionality of the user interface 209 that allows users to expand a selected event 210, in accordance with some embodiments. An event 210 may have one or more sub-events 220 that may be shown when a user selects an event 210 and/or an icon 221 associated with the event 210. For example, for an event 210 that is a television show, the event 210 may have multiple showings (e.g., one showing each week). By expanding the event 210, the user may individually view and/or edit the sub-events 220. For example, the user may view an individual cost and/or score associated with the sub-event 220 and delete or add spots associated with the individual sub-event 220. The scoring engine 112 and recommendation 114 may perform analysis on both events 210 and sub-events 220. Events 210 and/or sub-events 220 may comprise multiple spots. For example, an event 210 may be a television show and the television show may have commercial breaks that include one or more spots that advertisers can buy from sellers in order to advertise products.

FIG. 2F illustrates further functionality of the user interface that allows users to expand recommended events 210, in accordance with some embodiments. A user may select an individual event 210 from the recommendations 214 to view sub-events 220 associated with the event 210. In this way, a user may remove and/or add individual spots associated with sub-events 220 or full events 210. As shown in FIG. 2F, the user may select Event G to select an Event G spot for removal from the current package 212.

Advantageously, as the user interacts with system via the interactive user interface, and makes changes to the package, including applying one or more recommendations, the system automatically recalculates all scores and other information in the header 201. Thus, the user may easily and efficiently edit the package and arrive at an optimized package solution.

The system may, in some implementations, track a history of changes to the package. FIG. 2G illustrates a package history user interface element 222, in which it is indicated that certain events have been removed from the current package. As shown in FIG. 2G, Event G has been removed from the current package 212. The pop-up window 222 may notify users of changes that have been made to the current package 212. For example, the pop-up window 222 shows that Event G has been removed from the current package 212.

In some implementations, the user may select to jump back to a previous package state in the history indicated in the pop-up window 222.

Advantageously, in some implementations, the system automatically re-determines recommendations as the package is changed. Alternatively, and/or in addition, the system may re-prioritize and/or re-order recommendations based on changes to the package.

Example User Profile User Interfaces

Figure 3B:
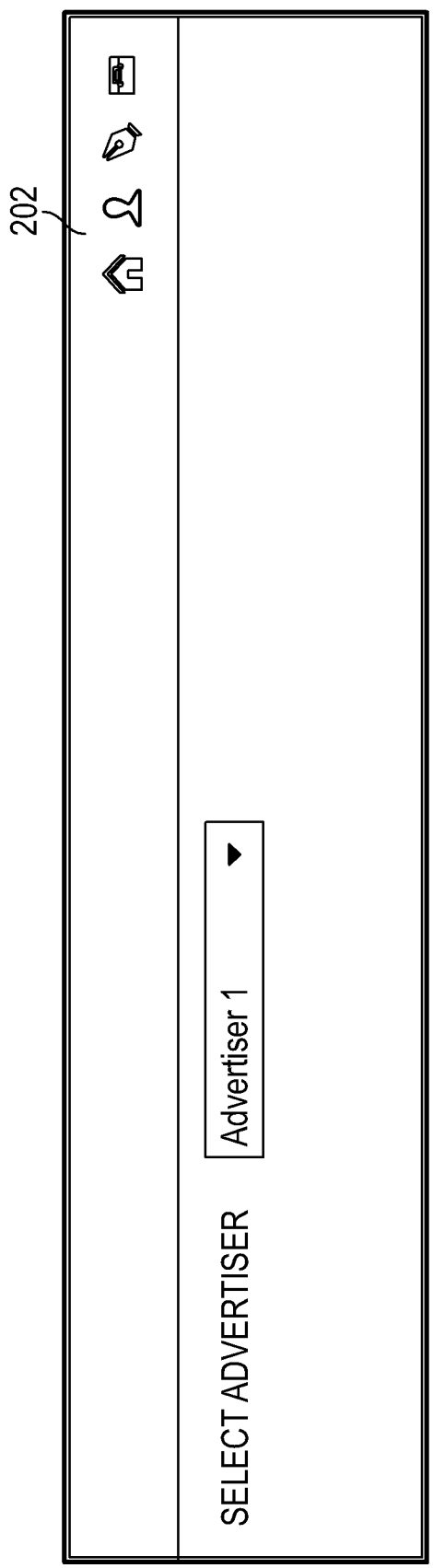

FIGS. 3A-3E illustrate an example user profile user interface 302, in accordance with some embodiments. As indicated by FIG. 3A, each of FIGS. 3B-3E represent example portions of a user interface 302. In various implementations, the portions of the user interface may be rearranged, and/or may include more of fewer portions/elements.

FIG. 3B illustrates a header portion of the user interface 302. As shown, the user profile user interface 302 may be selected via the buttons 202, and the header portion allows the user to select a particular advertiser of interest via a drop down box (and/or another suitable user interface element).

Figure 3C:
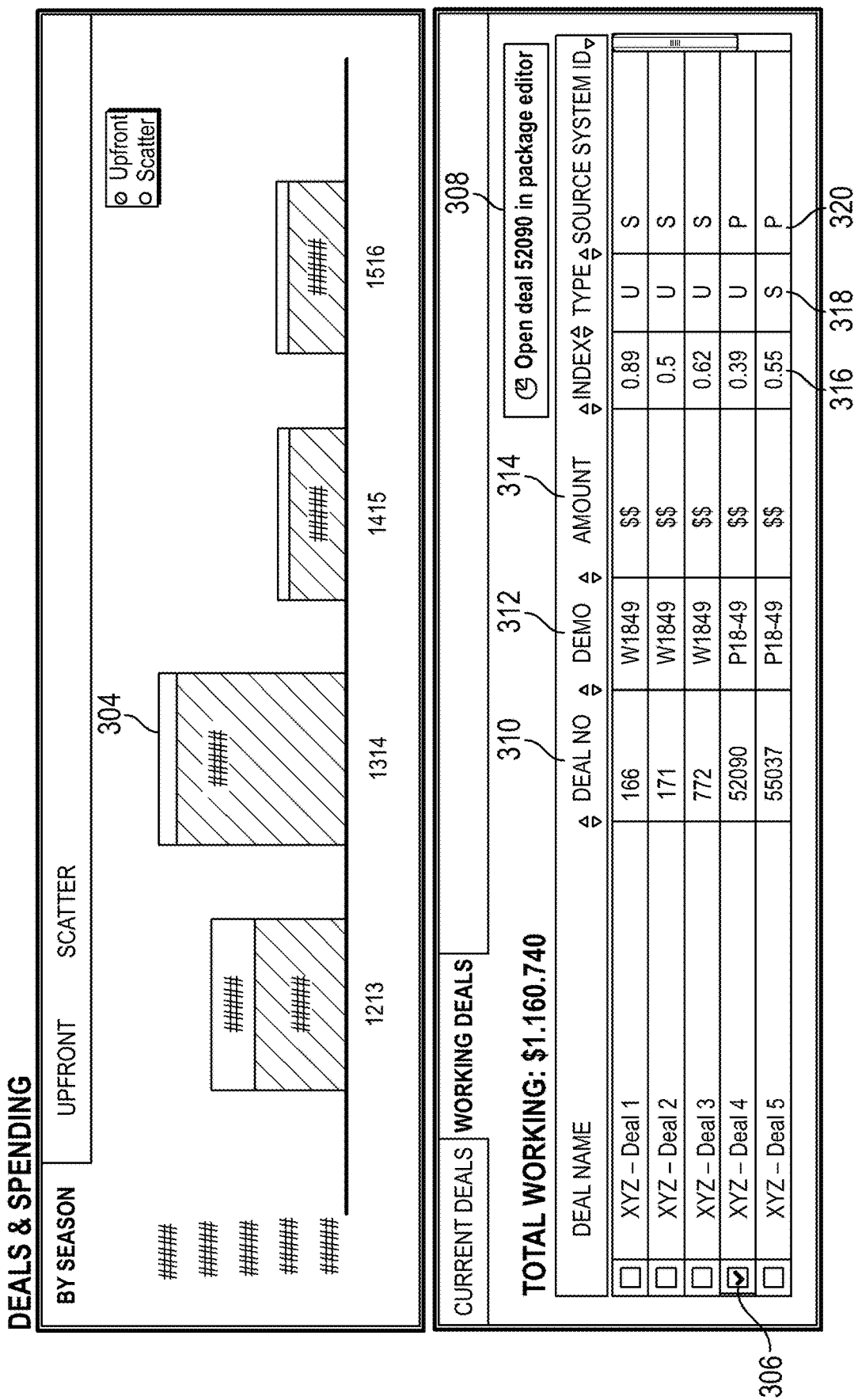

FIG. 3C illustrates a user interface portion of user interface 302 (as indicated in FIG. 3A) that shows profile information regarding deals and spending related to the selected advertiser. The user interface portion of FIG. 3C displays various information specific to the advertiser, such as a bar chart 304 that can be modified to show historical trends of deals made by the advertiser or amounts spent by the advertiser. The deals and/or spending can be categorized based on time, type, location, etc. A user may also select individual deals 306 (e.g., packages) that the advertiser previously made or is currently working on and select an icon 308 to open the deal 306 in another page, such as the package editor user interface shown in FIG. 2A. Various information for a given deal may also be displayed in the user interface portion of FIG. 3C, such as deal number 310, target demographic 312, amount spent or sold 314, index 316, type 318, and source system identification 320.

Figure 3D:
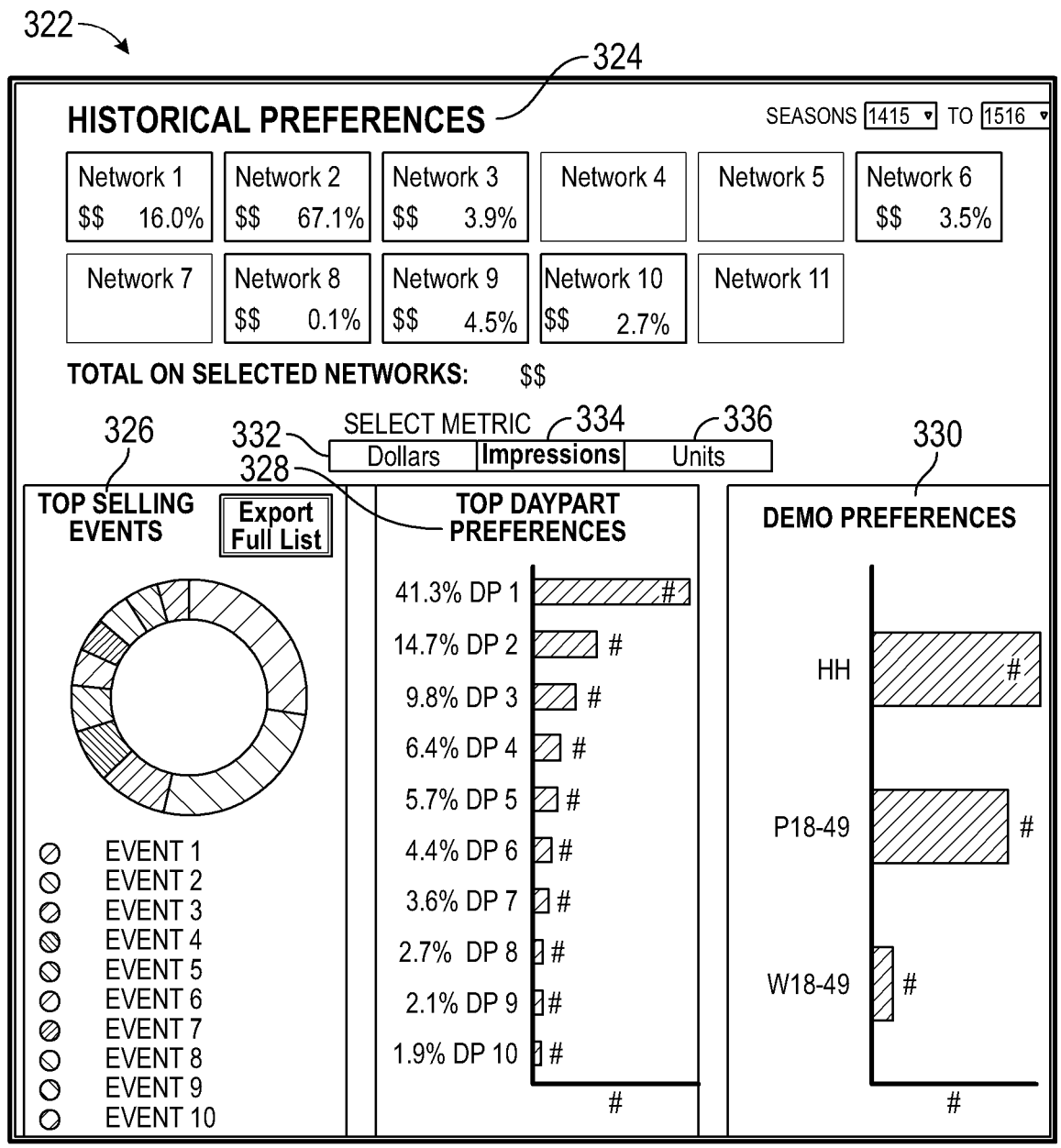

FIG. 3D illustrates a user interface portion 322 of user interface 302 (as indicated in FIG. 3A) the shows historical preferences of an advertiser, in accordance with some embodiments. The user interface portion 322 may include information regarding usage by network 324, event 326, time 328, and demographic 330. The usage may be viewed in a variety of units, including dollars 332, impressions 334, and units 336.

Figure 3E:
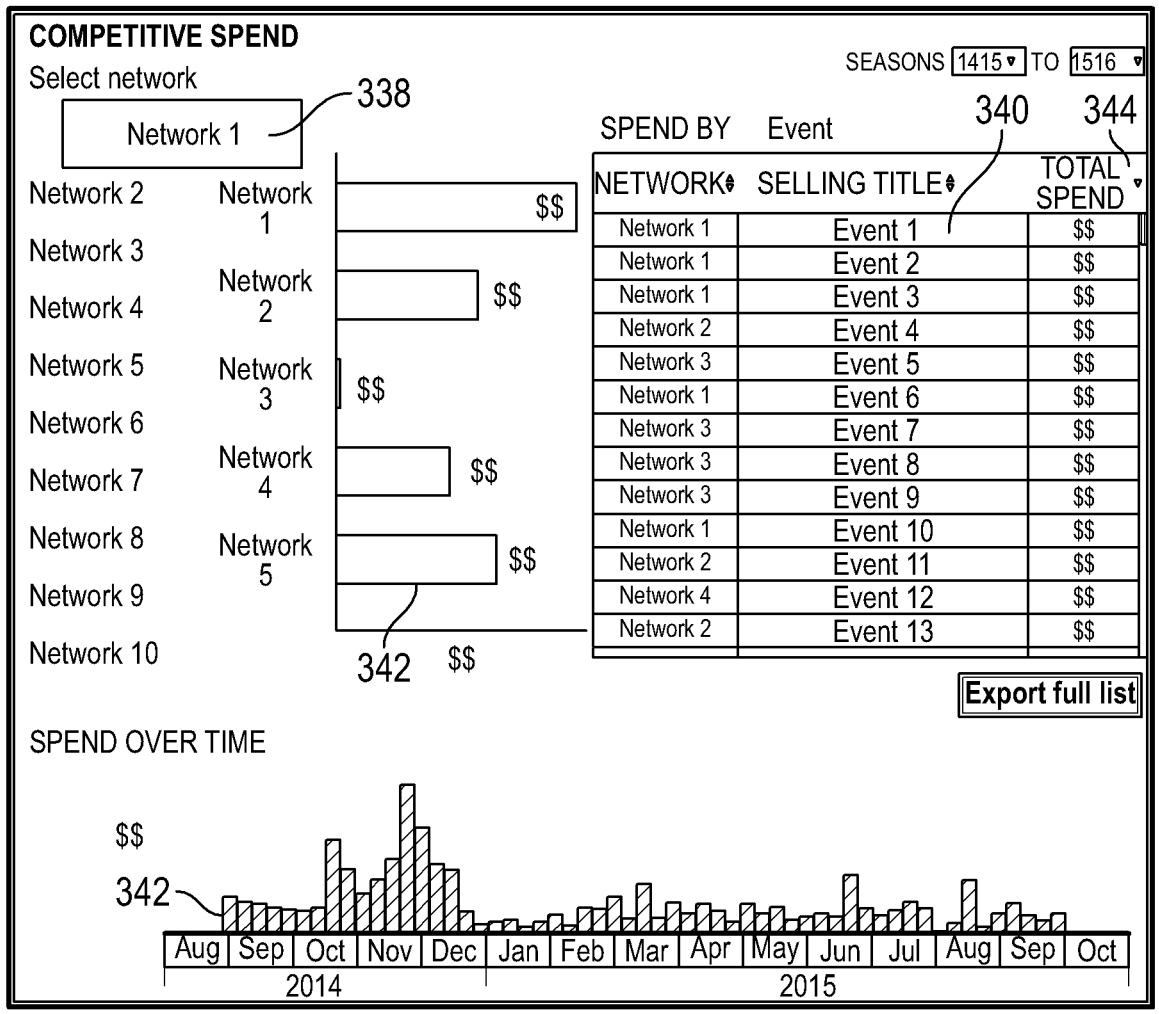

FIG. 3E illustrates a user interface portion of user interface 302 (as indicated in FIG. 3A) that shows spending of an advertiser. Spending can be categorized by network 338 and/or event 340 and may be represented in various charts, including bar charts 342 and tables 344.

Example Negotiation Tool User Interfaces

Figure 4A:
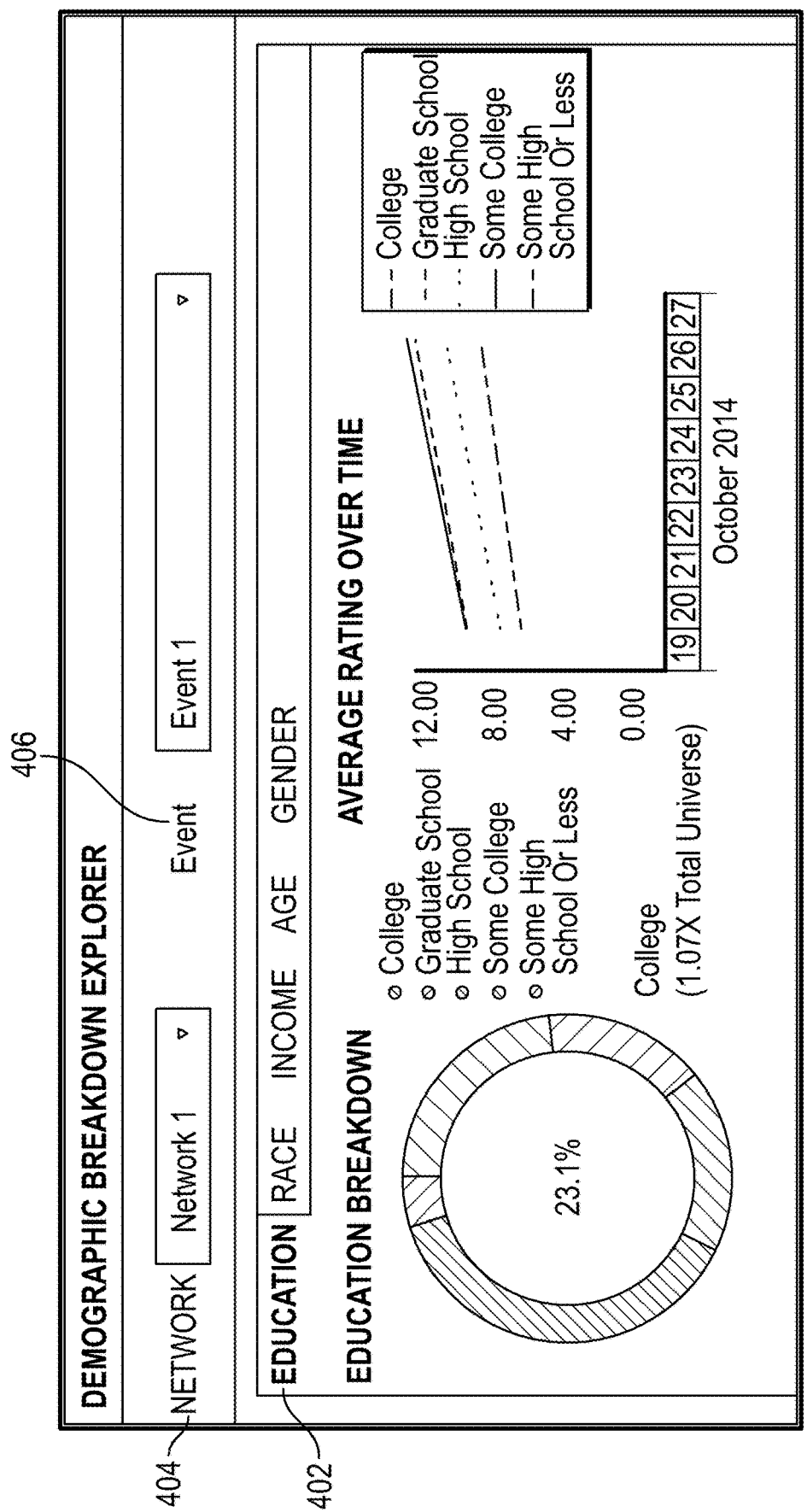

FIGS. 4A-4C illustrate example negotiation tool user interfaces, in accordance with some embodiments. FIG. 4A illustrates a demographic breakdown explorer which may provide statistical information regarding persons participating in events. Users may select between multiple demographics 402 and view demographic information for various networks 404 and events 406.

FIG. 4B illustrates an availability tracker which may display information regarding availability of events. Event availability may be displayed using various charts, including tables 408 and bar charts 410. A user may choose to view availability for particular events 412 and demographics 414.

FIG. 4C illustrates a selling title finder which may provide functionality for searching for events. For example, users may search using one or more event types 416 (e.g., sports, education, etc.) and categories 418 (e.g., college, professional, etc.).

Example Evaluation Tool User Interface

Figure 5A:
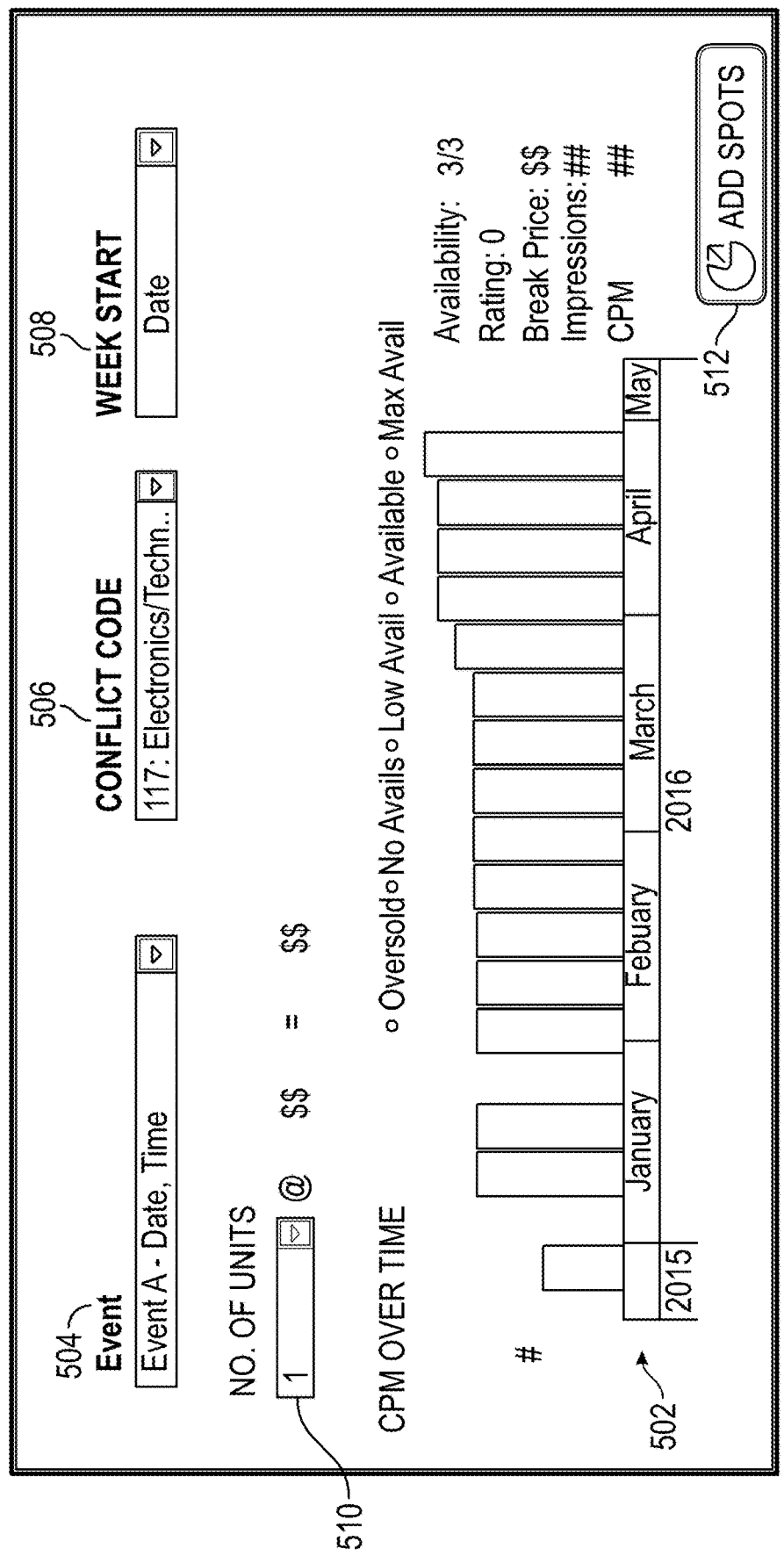

FIGS. 5A-5B illustrate example evaluation tool user interfaces, in accordance with some embodiments. FIG. 5A illustrates an event evaluator that allows user to view cost per impression over a period of time. For example, the data may be displayed in a bar chart 502. A user may add spots to a given package by selecting an event 504, a conflict code 506, a date 508, and a number of units/spots 510, and selecting an icon 512 to add the spot to the package. The user may then see how adding the spot affects the overall package.

FIG. 5B illustrates an index editor that allows users to input an index to evaluate various packages (i.e., deals). An index may reflect an expected discount associated with a spot. A lower index may indicate a higher discount. Spots may have associated discounts determined by a location, date, time, type of event, the user purchasing the spot, and/or other factors. For example, a television advertising market may be composed of "upfront" deals, where packages are sold as bulk to advertising agencies during a small timeframe, and "scatter" deals, where packages are negotiated on an ad-hoc basis. Deals signed in the upfront market may get a lower index (i.e., a larger discount) than deals signed in the scatter market.

The index editor 514 may allow users to input different index values 516 to evaluate a deal (given specific deal metrics 518) at different indexes.

Example Methods/Processes Related to the Interactive User Interfaces

Figure 6:
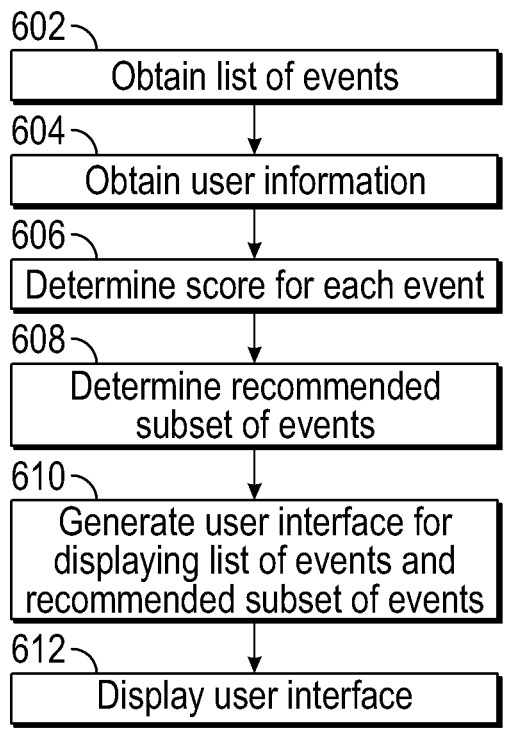
FIG. 6 is a flowchart depicting an illustrative process for evaluating events, spots, and/or packages, in accordance with some embodiments.

FIG. 6 is a flowchart depicting an illustrative process for evaluating events, spots, and/or packages, in accordance with some embodiments. At block 602, the system may obtain a list of events. For example, the packaging web service 106 may request event information from the event data store 108 via the network 104.

At block 604, the system may obtain user information. For example the packaging web service 106 may request user information from the user data store 110 via the network 104. The user information may be specific to a user or multiple users or may be generic to all users. For example, a user may sign in using the user interface 102 and the packaging web service 106 may request information associated with the user's login information.

At block 606, the system may determine a score for one or more spots and/or packages. For example, the packaging web service 106 may communicate with the scoring engine 112 to determine a score for one or more spots received from the event data store 108. The one or more spots may be selected based on the user information received from the user data store 110. For example, scores may be determined for spots included in a package created by the user.

At block 608, the system may determine a recommended subset of spots. For example, the packaging web service 106 may communicate with the recommendation engine 114 to determine a recommended subset of one or more spots received from the event data store 108. The recommended subset of spots may be selected based on the user information received from the user data store 110. For example, the recommendation engine 114 may select spots from a package created by the user that the recommendation engine 114 may recommend removing from the package. The recommendation engine 114 may also determine that one or more spots have a higher score than specific spots in the user's package and may recommend adding such spots.

At block 610, the system may generate a user interface for displaying events, spots, and/or packages to the user. For example, the user interface may be a web page associated with a web page the user accessed to login to the packaging web service 106. The user interface may display a variety of events, including events that comprise spots included in a user's current package 203, and a list of recommended spots.

At block 612, the system may display the user interface to allow the user to view the events, spots, and/or packages, and then interact with the package as described above. Thus, as inputs are received from the user, the system may continuously (and/or in response to user inputs) re-obtain event and/or user information (if needed), re-determine scores, re-determine recommendations, and/or update the user interface.

In some embodiments, the system may be in communication with various APIs to allow the system to export and/or import data with external systems. For example, after a user reviews a package in the user interface, the user may export the package to an external system for carrying out a transaction using the package. The system may perform a call to an API that opens the external system and transfers the package data.

Data from such external systems may be imported for use in updating stored event data and/or user data. For example, deals that users have made in external systems may be imported as historical data for the completed transaction. Such data may be used in performing pre-calculation of normalized data for use in scoring and/or recommendations.

For packages currently being created and/or edited by users, newly available data (e.g., data that was received after the package was created) may not be applied to the package until requested by the user. The user may optionally refresh a package to incorporate the newly available data. Before refreshing the information, the system may determine and display to the user the changes that will be made to the current package as a result of the refresh. The user may then have the option to proceed with the refresh.

The system may be configured to alert users based on information received from the user, newly received information, and/or stored data. For example, if newly available information would create a significant effect on a package the user is working on, the system may alert the user. In some embodiments, the alert and/or notification is automatically transmitted to the user interface and/or user device. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a health data monitoring application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Example Methods/Processes Related to Scoring

Figure 7:
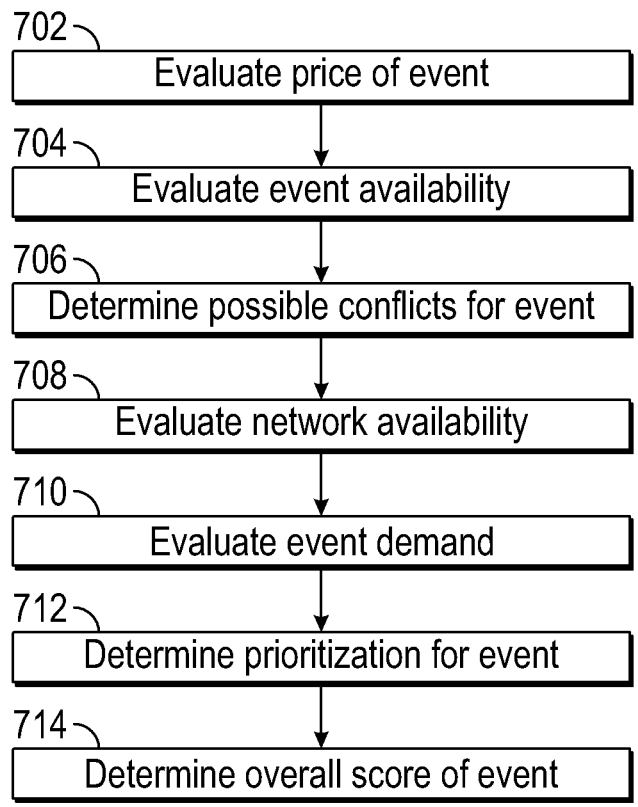
FIG. 7 is a flowchart depicting an illustrative scoring process which may be performed by a system, in accordance with some embodiments.

FIG. 7 is a flowchart depicting an illustrative scoring process which may be performed by the system, in accordance with some embodiments. For example, such scoring may be performed in conjunction with block 606 of FIG. 6. The scoring process may involve calculating multiple scores for various categories which may be combined to produce an overall score. For example, the categories may include relative pricing and/or cost, inventory pressure, relative availability, demo efficiency, and priorities. Each category may have an individual score (referred to herein as a "component score") which may be added up to determine a spot score. Categories may have different maximum values, and the spot and package may as a result have maximum values. A score for a package may be computed based on the individual scores and costs of each of the spots within the package, as well as the number of units of each spot. In some instances, the package score may be similar to the score of the individual spot in the package having the highest cost, the greatest number of units, etc. For example, a spot may be an episode of a television show. A user may purchase one or more spots (e.g., units) during the episode. Each spot may have an associated fee and score. In another example, a spot may be a product sold by a manufacturer. A user may purchase one or more products (including multiple units of particular products, if desired) during a sale by the manufacturer. Each product may have an associated score (e.g., an evaluation of the price of the product compared to prices from other sellers) and the individual product scores may be used to compute an overall package score for a group of products.

At block 702, the system may compare a price of spot with historical similar spots. For example, for an event that is a television show, the show may have aired episodes previously, and advertisers paid a given price to advertise during the previous episodes of the show. A user may have received a pricing offer from a purchaser for an upcoming episode. The system would compare the price paid for previous episodes with the price currently offered to the user. For a show that has no historical spots, a default component score for relative pricing may be applied.

Additionally, an evaluation and/or comparison may be made between expected cost per unit of value for each spot. For example, an advertiser may evaluate an event by determining an expected amount the advertiser expects to pay in order to have one viewer respond to the advertisement. If an advertiser expects to pay $30,000 dollars to advertise during a spot and expects to have 1,000 viewers respond to the advertisement as a result, the cost per thousand impressions (i.e., responses) for that spot would be $30. These evaluations may be based on historical information, information about the upcoming spot itself, contextual information (time of day, location), etc. By using a variable, such as cost per thousand impressions, for multiple spots, the spots may be effectively be compared.

Moreover, the expected cost may be further specified by determining a desired type of impression. For example, an advertiser may target one or more demographic types. In this case, only expected impressions from viewers that belong to the one or more demographic types would be included in the cost per thousand impressions calculation.

The number of impressions can be estimated in various ways. For example, historical information may indicate a number of households that viewed a particular television show. However, it may not be known how many viewers were in each household, let alone how many of those viewers belonged to a given demographic. This information may be estimated based on the number of households. For example, it may be estimated that there are two viewers in each household, and that 50% of all viewers are male. Thus, if the target demographic is males, it may be estimated that there is one viewer in the target demographic for each viewing household.

Estimates may vary based on event. For example, for a television show that historically draws a heavily female audience, it may be estimated that only 10% of all viewers are male. In that case, for every 5 households having an estimated two viewers per household, only one viewer may be expected to be in the male demographic. In order to properly compare multiple spots, estimates for each spots may generally apply identical factors, such as target demographic and number of viewers per viewing household. In this way, the cost per impression for each spot may be normalized to provide improved comparison.

In comparing prices, adjustments may be made to historical and/or current prices as part of a normalization process. The normalization process may improve comparability by eliminating effects of factors not being compared. For example, adjustments may be made based on index in order to evaluate historical transactions for a given index. For example, if a user is considering purchasing spots for an upcoming event in the upfront market, historical deals that were made using the scatter market may be adjusted to accurately convey what the deal likely would have been in the upfront market. This may be done by first cancelling an expected effect of the previous index and then applying the new index to the previous transaction.

The normalization process may also include adjustments based on trends in cost. For example, an expected or actual cost for a television show may increase during a month when more viewership is expected. As a result, historical transactions can be adjusted to reflect a current situation. That is, for example, if a user is interested in a spot in February, spots purchased in December may be adjusted to reflect an expected cost in February. One option for determining this is by calculating a ratio between a current expected price and a historical expected price to determine a scaling factor and multiplying the ratio by an actual historical price. In this way, previous transactions can accurately be compared to current offers.

Comparing the price of a spot to historical spots may involve determining whether an adjusted cost per impression is high or low compared to the historical spots, as well as the price's amount of deviation from the historical spots. For example, a ratio may be determined with the difference between the determined cost per impression for a given spot and a scaled average cost per impression for historical spots being in the numerator and the standard deviation of the scaled average cost per impression for the historical deals being in the denominator. A positive value from this equation would indicate that a seller of the spot would be selling above the average selling price, and would therefore indicate a good deal for the seller. If all historical spots are equivalent (i.e., there is no standard deviation), the standard deviation can be set to a percentage of the mean, based on a coefficient of variation (CV) weighted by an inverse number of spots that all have the same guaranteed cost per impression. To determine the CV, all historical spots that have a range of cost per impression can be used in calculating a standard deviation. Then, for each spot to be sold, the mean and standard deviation can be calculated and the standard deviation can then be divided by the mean. The result is essentially the percentage of the mean that the standard deviation constitutes for each spot in a given period of time. As an additional measure, the result may then be weighted by the inverse of the number of spots in the set. For example, the result can be divided by the number of equivalent historical spots and that quotient can be multiplied by the average cost per impression of the historical spots. That is, the more spots there are with an identical cost per impression, the more confidence that the value of the standard deviation should be small.

A relative pricing metric may be calculated by comparing spots to historical data. This may involve normalizing a spot score and comparing the normalized spot score to normalized historical spot scores. The normalized spot score may include an evaluation of the cost per impression for the particular spot.

Some computations, including those described above regarding the relative pricing metric and related normalization process, may apply pre-computing to improve efficiency. For example, rather than applying a normalization process to historical data at the time of comparison, normalized data can be computed at the time the data is received and/or at various other times. In some embodiments, pre-computing may be performed on a periodic basis. For example, pre-computing may be performed daily at expected low-traffic times (e.g., late at night) for data collected during the day. The normalized data can then be stored and accessed as needed for comparisons and/or other uses.

Some embodiments may also apply parallel computing in order to improve efficiency. For example, a program for applying the relative pricing metric may have multiple threads of execution such that data may be normalized while data is aggregated for comparison.

At block 704, the system may evaluate spot availability. Continuing the example of an event being a television show, the show may have already committed several advertising slots to others and may have a very limited inventory available. A higher availability for the show may correspond to a higher overall score for the show for the seller. That is, if a show has many spots available, it is advantageous to sell such spots because they may be difficult to sell, so the score for the seller will increase.

At block 706, the system may determine possible conflicts for a spot. For example, if there is an unusual demand for a given spot for a particular category of advertisers (e.g., advertisers selling similar products), this may be considered a conflict. As a result, the selling price may increase for the spot and/or the determined score for a seller of the spot may be decreased (e.g., to indicate that the seller is not maximizing the value of the spot). In some instances, the system may respond to a conflict by artificially increasing the cost per impression for the spot. A conflict metric of a spot for a particular user may be evaluated by computing the availability of the spot along with a measurement of possible conflicts in the available spots for the particular user.

At block 708, the system may compare availability of a spot with other spots having similar characteristics. For example, it may be determined whether the availability of a particular show is higher or lower than other shows that are aired on the same television network as the particular show. A lower availability compared to other shows on the network may correspond to a lower score for the show for sellers, as such shows may be considered easier to sell. A relative availability metric may be determined for individual spots by calculating the availability of the spot and comparing the spot availability with the network average.

At block 710, the system may evaluate demand for a particular spot. For example, based on historical information, it may be determined that a particular show is more likely to sell out than other shows. A show that is in high demand is considered easy to sell and therefore the score may be lowered for a seller. Demand may in some cases be determined by a rating associated with the event. For example, if users have rated a show highly, the show may be considered to have high demand.

At block 712, the system may determine prioritization of a spot. Priorities may be determined by a user and/or by the system. For example, the system may prioritize a particular date or time of day. A user may prioritize a television show that the user particularly enjoys. A priority metric for an individual spot may be determined by adjusting a default priority value by an adjustment value (set manually by the user or automatically by the system) for the spot.

At block 714, the system may determine an overall score of the event, package, and/or spot. The overall score of a spot may be a combination of the calculations discussed above. Moreover, the overall score of a package may be a combination of the scores of the individual spots in the package.

The overall score of a spot may be scaled based on overall scores of other spots. For example, after assigning scores to multiple spots, the scores of the multiple spots may be compared and one or more of the spots may receive a new score that indicates how the spot compares to the rest of the spots. For example, the new score may be a percentage value, such that it falls between 1 and 100. This may be determined by calculating a number of spots that a given spot scored higher than and dividing the number by the total number of spots.

The overall score may further be weighted in terms of the user's overall budget. For example the system may multiply the cost for each spot by the score for each spot and divide the result by the user's total budget. The system may calculate a summation of all of these values to determine an overall score for an event and/or package.

Example Methods/Processes Related to Generating Recommendations

Figure 8:
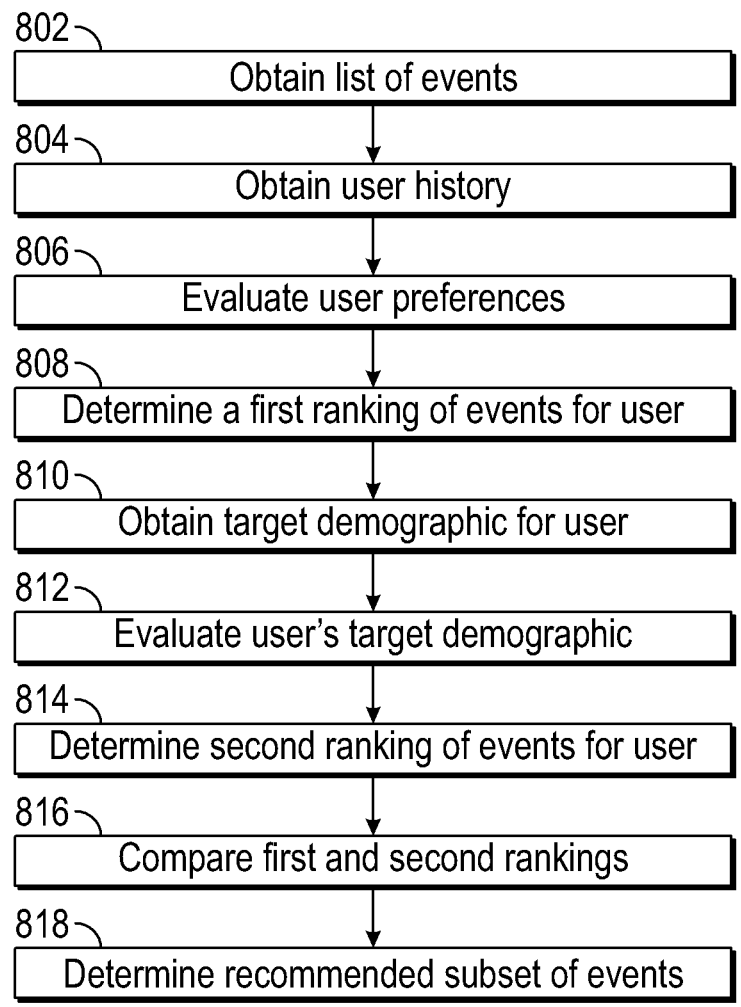
FIG. 8 is a flowchart depicting an illustrative recommendation process which may be performed by a system, in accordance with some embodiments.

FIG. 8 is a flowchart depicting an illustrative recommendation process which may be performed by a system. For example, such scoring may be performed in conjunction with block 608 of FIG. 6. The recommendation process of FIG. 8 may be used to generate recommendation of spots, events, and/or packages to users. For example, the recommendation process may provide a list of spots that a user who is an account executive could sell to an advertiser. The recommended spots would be those that would improve an overall package score. These could be spots that already exist in the package (e.g., to remove), or new spots (e.g., to add). One approach would be to score each spot available in inventory and see how it would affect an overall deal score. However, other approaches may focus on particular spots.

At block 802, the system may obtain event information as discussed above.

At block 804, the system may obtain user information, such as user purchasing history. For example, if the user has accessed the system and/or another system previously to conduct transactions, the transaction information may be obtained. User information may include information for both buyers and sellers. For example, buyer transaction history may be used in creating recommendations for a seller, and vice versa. Accordingly, as used in reference to FIG. 8, the term "user" may include advertisers, networks, and/or the like.

At block 806, the system may evaluate user preferences. The user preferences may be determined based on the obtained user information. For example, if a buyer has frequently purchased spots for a particular show, this may lead to an inference that the buyer prefers similar spots. Spots not purchased by a user, on the other hand, may or may not lead to an inference that the user does not prefer such spots.

Context of purchases may be used in determining preferences. For example, if an advertiser bought a spot while it was particularly cheap, the spot may not be a preference because the user may have simply been interested in the price. Various other factors may also be used, such as availability of the show, competition for the show with other shows, and repeat feedback. These various factors may be aggregated along with user purchase history to compute predicted preferences for a user.

At block 808, the system may determine a first ranking of the one or more events obtained by the system. The first ranking may be based on the evaluation of the user preferences. For example, the system may determine events that match with user preferences. The predicted preferences discussed above may be used in ranking the events. For example, the events may be assigned values based on the predicted preferences and then sorted according to the assigned values.

A variety of values may be used may be used in determining user preferences. For example, values may include a historical number of spots purchased/sold by the user for a particular event, the total dollar value a user has spent on an event, etc. For the number of spots, purchases for an event that happens every week of the year may be weighted much more than just an event that occurs once a year (e.g., the Super Bowl). For total dollar value, a user purchasing very expensive spots may outweigh the advertiser's actual preference of purchasing a much cheaper but more frequent spot. These values may be used in weighting the rankings discussed above. The weighting may involve setting a peak distribution of spots. Spots may be optimized to achieve a lowest rank.

At block 810, the system may obtain demographic information for the user. For example, the demographic information may reflect one or more demographics that the user may want to target with advertisements.

At block 812, the system may compare the one or more spots with the obtained demographic information. The obtained demographic information may be used in matching packages, events, and/or spots with users. The matching may involve calculating (or estimating) an average number of viewers per viewing household of a particular event and/or spot. A weighted average of viewers per viewing household may then be calculated for each user and/or each demographic. Then, for each advertiser and selling title, a difference of an average number of viewers per viewing household for each demographic may be calculated and the absolute differences may be summed.

At block 814, the system may determine a second ranking of the one or more spots obtained by the system. For example, the second ranking may be based on the comparison of the one or more spots with the demographic information. For example, the spots may then be ranked based on the summation of the absolute differences.

At block 816, the system may compare the first and second rankings. A given number (e.g., 100) of each of the first and second rankings may be unioned and the value of each unioned ranking to a current package may be determined. For each spot in a package, the system may calculate an expected increase in value to the package by adding the spot. This calculation may involve determining the availability of each spot as well as available inventory for a particular user, demographic, etc. The spots that provide the greatest value (e.g., increase in score of the package) may be selected. The added value of each individual spot may also be determined. The added value of removing each individual spot from a current package may also be determined.

At block 818, the system may determine a recommended subset of events of the one or more events. The recommended subset of events may be based on the comparison of the first and second rankings. For example, a given number of the events and/or spot determined to add the highest value may be provided and a given number of the events and/or spots determined to add the highest value by being removed from the current package may be included in the subset.

In some embodiments, as mentioned above, the system may further employ one or more artificial intelligence algorithms in conjunction with, in addition to, and/or as an alternative to, the recommendation process of FIG. 8. Such artificial intelligence algorithms may include a collaborative filtering algorithm, a monte carlo-based algorithm, a genetic algorithm, a simulated annealing algorithm, and/or the like. For example, such algorithms may be applied in updating scores based on newly available data and/or adjustments to packages, creating user preferences from user transactions and/or profile information, determining similarities between events for use in comparisons, etc.

Implementation Mechanisms

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a GUI, among other things.

Figure 9:
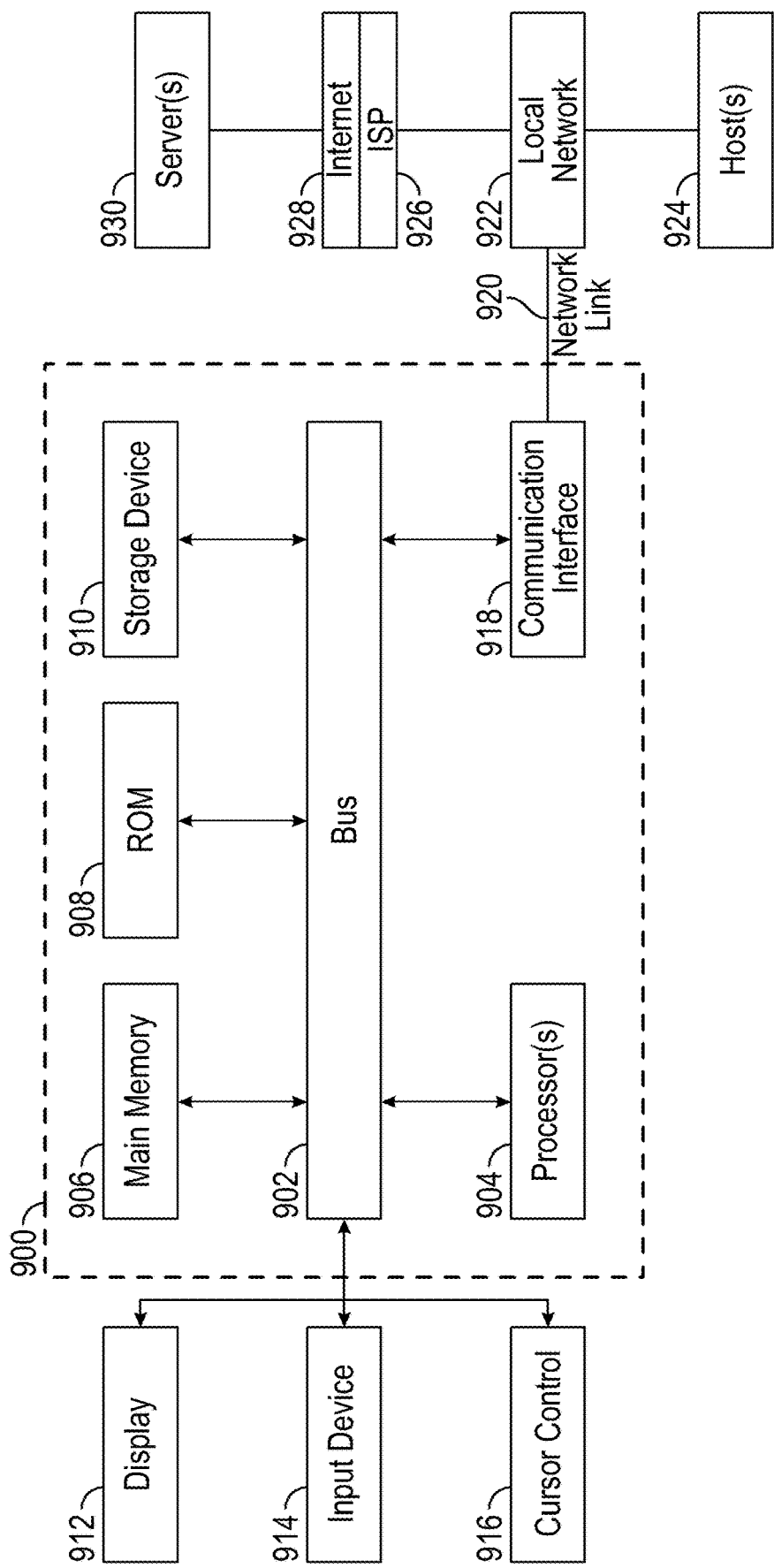
FIG. 9 illustrates a computer system with which certain methods and user interfaces discussed herein may be implemented, in accordance with some embodiments.

For example, FIG. 9 is a block diagram that illustrates a computer system 900 upon which various embodiments may be implemented. For example, any of the computing devices discussed herein (e.g., any of the aspects of the network environment of FIG. 1, may include some or all of the components and/or functionality of the computer system 900.

Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. Main memory 906 may also store cached data, such as zoom levels and maximum and minimum sensor values at each zoom level.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions. For example, the storage device 910 may store measurement data obtained from a plurality of sensors.

Computer system 900 may be coupled via bus 902 to a display 912, such as a cathode ray tube (CRT) or LCD display (or touch screen), for displaying information to a computer user. For example, the display 912 can be used to display any of the user interfaces described herein with respect to FIGS. 1 through 11D. An input device 914, including alphanumeric and other keys, is coupled to bus 902 for communicating information and command selections to processor 904. Another type of user input device is cursor control 416, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage. Examples of modules of the present disclosure include, in some implementations, packaging web service 106, scoring engine 112, recommendation engine 114, and/or user interface 102 (and/or a module configured to generate user interfaces and/or user interface data).

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieve and execute the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
one or more processors configured to execute software instructions to cause the system to:
analyze a subset of data items from a plurality of data items to determine a score associated with the subset of data items;
access historical information associated with one or more of the plurality of data items;
analyze the subset of data items to determine an item score for each data item of one or more of the plurality of data items, wherein determining the item score for a first data item further comprises combining a plurality of item scores;
determine, for each data item of at least some of the plurality of data items, and based at least in part on the historical information, respective effects on the score if the respective data items are added to or removed from the subset of data items;
determine, based at least in part on the respective effects, a ranking of the at least some of the plurality of data items; and
generate user interface data usable for rendering a user interface, the user interface including:
an indication of the score, and
a selectable list of the at least some of the plurality of data items ordered based on the ranking.

2. The system of claim 1, wherein determining the item score for a first data item comprises at least one of: evaluating a cost associated with the first item, determining an availability of other data items similar to the first data item, determining an expected demand for the first data item, determining a prioritization of the first data item, or determining a historic demand for the first data item.

3. The system of claim 1, wherein the plurality of item scores comprises:
a first item score that is determined based on demographic information, and
a second item score that is determined based on a history of a data item to which the second item score corresponds.

4. The system of claim 1, wherein the one or more processors are configured to execute the software instructions to further cause the system to:
receive a selection, by a user, of one or more selected data items from the selectable list; and
add the one or more selected data items to the subset of data items to generate an updated subset of data items.

5. The system of claim 4, wherein the one or more processors are configured to execute the software instructions to further cause the system to:
in response to the selection of the one or more selected data items:
analyze the updated subset of data items to determine an updated score associated with the updated subset of data items; and
update the user interface to include an indication of the updated score.

6. A computer-implemented method comprising:
by one or more processors executing program instructions:
analyzing a subset of data items from a plurality of data items to determine a score associated with the subset of data items;
accessing historical information associated with one or more of the plurality of data items;
analyzing the subset of data items to determine an item score for each data item of one or more of the plurality of data items, wherein determining the item score for a first data item further comprises combining a plurality of item scores;
determining, for each data item of at least some of the plurality of data items, and based at least in part on the historical information, respective effects on the score if the respective data items are added to or removed from the subset of data items;
determining, based at least in part on the respective effects, an item ranking of the at least some of the plurality of data items; and
generating user interface data usable for rendering a user interface, the user interface including:
an indication of the score, and
a selectable list of the at least some of the plurality of data items ordered based on the item ranking.

7. The method of claim 6, wherein determining the item ranking comprises determining a first ranking and a second ranking and combining the first and second rankings.

8. The method of claim 7, wherein determining the first ranking comprises at least one of: determining an expected demand for a first data item, determining a prioritization of a first data item, determining a demand for a first data item, comparing a transaction record of a user of the system with the plurality of data items, evaluating a cost associated with a first data item, or determining an availability of other data items similar to a first data item.

9. The method of claim 6 further comprising:
by the one or more processors executing program instructions:
detecting a change in the plurality of data items; and
re-determining the item ranking based on the plurality of data item, taking into account the change.

10. The method of claim 6, wherein the item ranking is at least partially determined based on at least one of: a collaborative filtering algorithm, a monte carlo-based algorithm, a genetic algorithm, or a simulated annealing algorithm.

11. The method of claim 6 further comprising:
by the one or more processors executing program instructions:
receiving a selection, by a user, of one or more selected data items from the selectable list; and
adding the one or more selected data items to the subset of data items to generate an updated subset of data items.

12. The method of claim 6 further comprising:
by the one or more processors executing program instructions:
in response to the selection of the one or more selected data items:
analyzing the updated subset of data items to determine an updated score associated with the updated subset of data items; and
updating the user interface to include an indication of the updated score.

* * * * *